(12) United States Patent
Kimerer, Jr.

(10) Patent No.: US 6,318,184 B1
(45) Date of Patent: *Nov. 20, 2001

(54) BEAM STRAIN GAUGE

(75) Inventor: Neil B. Kimerer, Jr., State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,799

(22) Filed: Aug. 23, 1999

Related U.S. Application Data

(63) Continuation-in-part of application No. 08/867,289, filed on Jun. 2, 1997, now Pat. No. 5,962,792.

(51) Int. Cl.$^7$ ..................................................... G01B 7/16
(52) U.S. Cl. ......................................... 73/772; 73/862.633
(58) Field of Search ............................... 73/760, 763, 772, 73/777, 794, 862.633, 862.634, 862.636, 862.637, 862.638, 862.639

(56) References Cited

U.S. PATENT DOCUMENTS

| 3,969,934 | 7/1976 | Raskin | 73/862.637 |
|---|---|---|---|
| 4,196,784 | 4/1980 | Suzuki et al. | 177/211 |
| 4,453,609 | * 6/1984 | Griffen et al. | 177/211 |
| 4,454,770 | 6/1984 | Kistler | 73/862.68 |
| 4,501,160 | * 2/1985 | Johnson | 73/862.65 |
| 4,542,800 | 9/1985 | Knothe et al. | 73/862.634 |
| 4,548,086 | 10/1985 | Kaste | 73/862.634 |
| 4,549,439 | 10/1985 | Keen et al. | 73/862.643 |
| 4,600,066 | * 7/1986 | Griffen et al. | 177/211 |
| 4,657,097 | * 4/1987 | Griffen | 177/211 |
| 4,803,883 | 2/1989 | Shutt | 73/514.21 |
| 5,510,581 | * 4/1996 | Angel | 177/211 |
| 5,512,713 | 4/1996 | Naito et al. | 177/211 |
| 5,526,700 | * 6/1996 | Akeel | 73/862.043 |
| 5,962,792 | * 10/1999 | Kimerer, Jr. | 73/772 |

OTHER PUBLICATIONS

Grove, R.C., Experimental Stress Analysis and Motion Measurement, pp. 50–75 and 76–133, Charles E. Merrill Publishing Co., Columbus, Ohio.

Young, W.C., Roark's Formulas for Stress and Strain, pp. 100–101, 6$^{th}$ Edition, McGraw–Hill, Inc.

Timoshenko, S.P., Mechanics of Meterials, pp. 125–126, Van Nostrand Reinhold Company.

* cited by examiner

Primary Examiner—Max Noori
(74) Attorney, Agent, or Firm—Ohlandt, Greeley, Ruggiero & Perle, L.L.P.

(57) ABSTRACT

Disclosed is a beam strain gauge to measure strain in a material which incorporates the theory of beam mechanics and the use of a full Wheatstone bridge circuit. In all cases the beam or beams used are not attached directly to the material to be measured, thereby making the beam or beams insensitive to transverse strain. The use of beam mechanics allows the use of the full Wheatstone bridge circuit, which has many desirable properties for strain measurement. Some of these properties are self compensation for temperature and a higher gauge output signal. The beam strain gauge can be employed using silicon chip technology and provides many advantages over the current conventional strain gauges.

22 Claims, 16 Drawing Sheets

BEAM STRAIN GAUGE

This application is a Continuation In Part application of U.S. Ser. No. 08/867,289 filed on Jun. 2, 1997 now U.S. Pat. No. 5,962,792.

BACKGROUND

A strain gauge measures strain in a material to which it is attached and can also be used to build load cells and accelerometers. Early strain gauges were manufactured by winding a thin wire around a paper tube and bonding the wire to the tube with cellulose glue. This wire wound combination was then flattened and bonded to the material to be tested for strain. The wire wound strain gauge was thick and limited by the type of adhesives available. Glue lines caused inaccuracies in strain measurements and caused creep when the gauge was used in load cells. Because the wire was wrapped in a spiral pattern and then flattened, a small length of the wire would be perpendicular to the length of the gauge at each end of the gauge. This small length of wire was sensitive to transverse strain, which is strain perpendicular to the strain direction that was intended to be measured by the gauge. The sensitivity to transverse strain is an undesirable feature for a strain gauge used in an unknown strain field because the angle of the desired strain to be measure with respect to the position of the gauge is unknown. The output signal generated from the transverse strain, therefore, cannot be separated from the output signal generated from the desired strain. This results in an error in the strain measurement values.

Following the wire wound strain gauge was the development of etched metal foil strain gauges. The etched foil gauge was manufactured from a metal foil about 5 $\mu$m thick bonded to a special plastic backing about 50 $\mu$m thick. A pattern was then etched into the foil to form a grid which was sensitive to strain in one direction. The etched foil gauges were found to be more sensitive to transverse strain than the wire wound gauges. This occurs because the relative width of the etched grids compared to the foil thickness allows inducement of strain in the grid across its width, which in turn changes the known resistance value of the gauge. Therefore, an error in measurement of strain occurs because the resistance change of the gauge due to the transverse strain is unknown. The etched foil gauges also have small transverse sections at each end of the grid that respond to transverse strain causing further errors in strain measurement.

Neither the wire wound gauges nor the etched foil gauges can be calibrated for use. For either type of gauge to work properly the part of the gauge bonded to the material to be measured must be strained by the strain field of the material. This requires the gauge to be flexible so when it is bonded to the material being measured it will transmit the strain into the metal foil or the wire. Once the gauge has been bonded to the material to be measured, it cannot be removed without damaging the gauge. This prevents the gauge from being mounted in a known strain field for calibration and then removed so it can be bonded to the material with the unknown strain field. Both the wire wound and the etched foil gauges are calibrated by selecting a small sample of gauges from a batch of manufactured gauges. The samples are then sacrificed by mounting them in a known strain field and measuring their output signal. From this signal an average gauge factor is determined and assumed that it applies to all the other gauges of that batch for calibration purposes.

The above mentioned strain gauges have been used in either a quarter, half or full Wheatstone bridge circuit configuration. A quarter Wheatstone bridge circuit is a full Wheatstone bridge with only one strain gauge, where the full Wheatstone bridge has four strain gauges. For a quarter Wheatstone bridge, the other three legs of a full Wheatstone bridge have precision resistors to replace the three strain gauges usually present. This configuration is required for the measurement of an unknown strain field because there is no way to determine the signal contribution of each gauge if there is more than one strain gauge. Wire wound and etched foil strain gauges also change resistance with temperature. With a quarter Wheatstone bridge, the active gauge will generate a signal that is based on temperature of the material to be measured. The signal of the active gauge due to temperature cannot be separated from the signal due to strain, thereby causing an error in the strain measurement. Since the other legs are not strain gauges, they do not respond to temperature in the same manner as the strain gauge and cannot be used to eliminate the signal due to temperature.

A half Wheatstone bridge circuit has two strain gauges. This circuit is used in some transducers, but cannot be used for the measurement of strain in an unknown strain field because of having more than one strain gauge as stated above. In the full Wheatstone bridge circuit, where all four legs are strain gauges, the signal due to temperature of the material cancels. Also, a larger strain signal is generated by the combination of four strain gauges. Another advantage of the full Wheatstone bridge circuit is that for much larger strains the output signal due to strain is linear, where the signal from quarter and half bridge circuits are not linear for larger strains. All the above mentioned features makes the full Wheatstone bridge a desirable circuit for strain measurement. However, the full Wheatstone bridge circuit cannot be used in an unknown strain field because there is no way to determine the signal contribution of each of the four gauges.

The next development in strain measurement was the semi-conductor strain gauge. Semi-conductor strain gauges do not produce an output signal that is linear with strain of the material to be measured, but by controlling the doping of the silicon crystal, a much larger output signal is produced for a given strain than a wire wound or etched foil gauge due to the material used in manufacture. However, they are much more temperature sensitive than the etched foil or the wire wound gauges. The semi-conductor gauges are usually used for unsteady force measurements where long term drift is not important and very small strains are to be measured. These gauges have the same adhesive limitations as the etched foil and wire wound gauges. There is also a change in the known resistance of the gauge due to the contraction of the adhesives as they cure because the semi-conductor gauges are so sensitive. Another type of strain gauge is made in the form of a transducer, which is manufactured using a process of thin film deposition. This is similar to electroplating except it is done in a vacuum at high temperature. The advantage of thin film deposition is that the film forms a molecular bond with the material it is being deposited onto. A thin film of metal is usually deposited onto a sensing element in a transducer that has been coated with an electrical insulator. The film is then etched into four foil strain gauge patterns to produce a full Wheatstone bridge circuit configuration. This technique eliminates the need for an adhesive bond but the transducer is limited by a smaller output signal from the strain, due to the low response inherent of any gauge using metal foil.

One of the desired features of a strain gauge is a large output signal due to the strain to be measured because the large signal is easier to measure. The output signal of strain from all the above mentioned strain gauges is dependent on the material used to manufacture the gauge and the whether a quarter, half or full Wheatstone bridge circuit configuration is used. As discussed above, the full Wheatstone bridge gives the largest output signal of strain plus the other important advantages inherent to this circuit. So, in order to achieve the largest possible signal and the other advantages involved with the full Wheatstone bridge, a way to used such a bridge circuit is desired.

It is the objective of this invention to provide a strain gauge that has lower inherent errors than previous strain gauges, is insensitive to transverse strain, provides a large output signal and employs the desired attributes of a full Wheatstone bridge circuit.

SUMMARY OF THE INVENTION

The present invention provides a first embodiment of a beam strain gauge using a beam having four strain gauges configured in a full Wheatstone bridge circuit mounted on it. The main components of the beam strain gauge include a top leg, a bottom leg, a beam, two side legs and a loading column. The components are arranged so that the bottom leg is below the top leg and the two side legs extend toward the top leg from the bottom leg. The beam is fixed between the side legs and is located between the top and bottom legs. The loading column is located between the top leg and the beam, thereby interconnecting the top leg and beam. The beam strain gauge is utilized by mounting the top and bottom legs to the material to be measured for strain. The loading column, beam and side legs are interconnected to the top and bottom legs as described, but are not directly mounted to the material. When strain is applied to the material, the top and bottom legs will move either away or towards each other. During this movement, the loading column will deflect the beam in a direction which depends on the direction of movement by the top and bottom legs. The four strain gauges which are mounted on the beam and configured in a full Wheatstone bridge circuit will produce an output signal during strain. This output signal can be inputted into known equations for a beam in bending to determine the actual strain in the material. Also, the known equations are not necessary as the beam strain gauge can be calibrated by applying a number of known strains to it and correlating each strain application to the output signal. After calibration, the beam strain gauge can be used and the output signal produced can be compared to the calibration.

There are also other embodiments of the present invention using beam mechanics that are variations on the first embodiment. Some of these embodiment employ more than one beam and also use beam(s) in tension and/or compression as opposed to a beam in bending. Another feature incorporated is the interconnection of the top and bottom legs with flexure openings to provide a stable frame that can be handle after the beam strain gauge is etched out of thin materials. Another embodiment disclosed incorporates some of the features of the first embodiment to provide an accelerometer.

DETAILED DESCRIPTION

The present invention provides a beam strain gauge which incorporates a unique frame-beam configuration and utilizes the theory of beam mechanics. Use of the frame-beam configuration allows the incorporation of the desired qualities of a full Wheatstone bridge circuit without incurring the disadvantages associated with it. The beam strain gauge can be formed out of various materials and shapes which incorporate the basic concepts of the frame-beam configuration and its relationship to the theory of beam mechanics. Examples of such materials are metals and the materials used to make semi-conductor chips and transducers. The beam strain gauge can be manufactured using current manufacturing techniques which include thin film deposition, etching, and photo lithography. As will be explained hereinafter in more detail, the beam strain gauge has a larger output signal due to strain than conventional strain gauges because of incorporation of the full Wheatstone bridge circuit. It is self compensating for the temperature and can be designed for a large range of strain values with no loss in sensitivity. It can be calibrated prior to use, thereby making it more accurate than conventional gauges. It is insensitive to transverse strain because the beam is not attached directly to the material being strained and therefore cannot respond to transverse strains. No new equipment or techniques are required, as all instrumentation now in use with existing strain gauges can be utilized. Signal conditioning and excitation voltage control can be included, making it ideal for use in "smart" sensors. It can also be configured to be an accelerometer.

Figure 1:
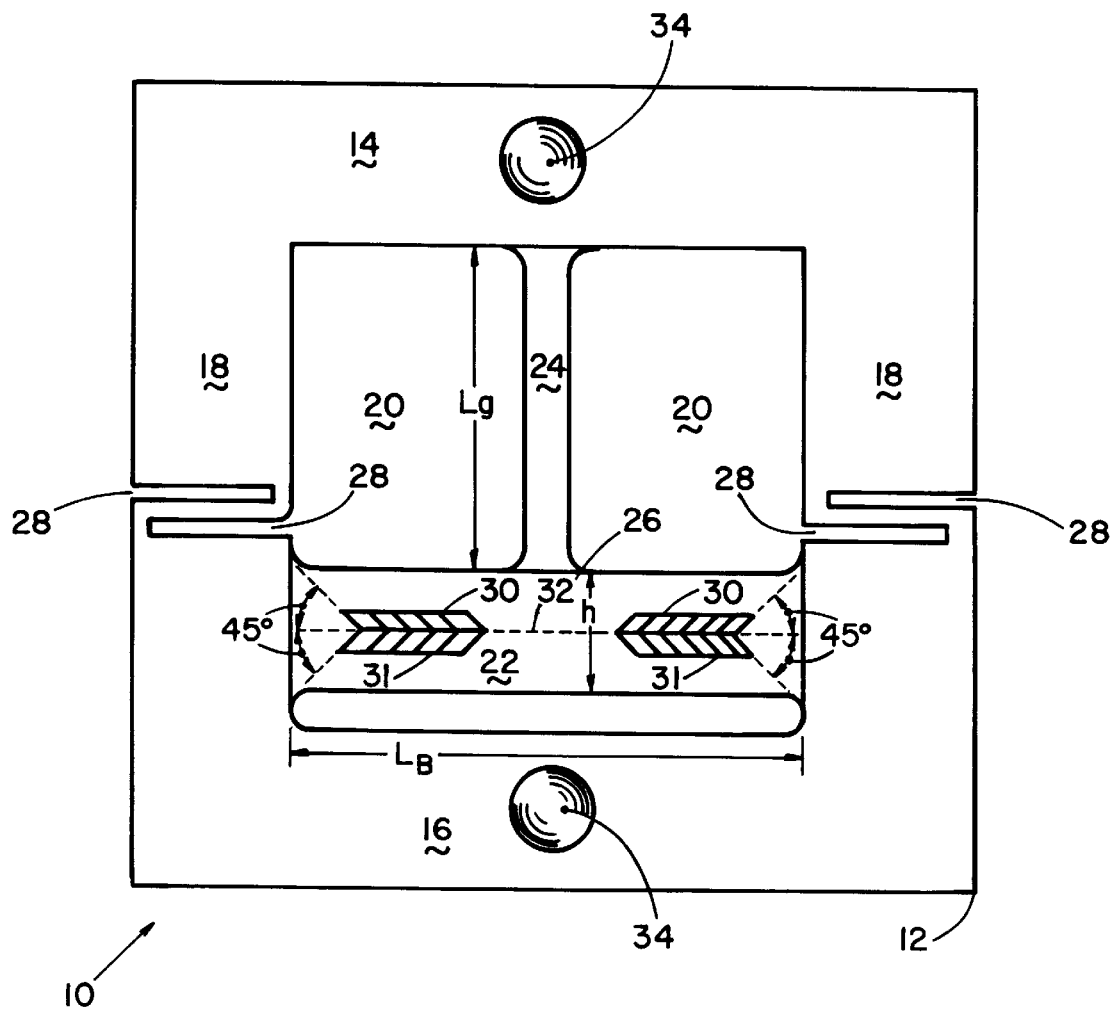
FIG. 1 is a top view of a first embodiment of the beam strain gauge.
Figure 2:
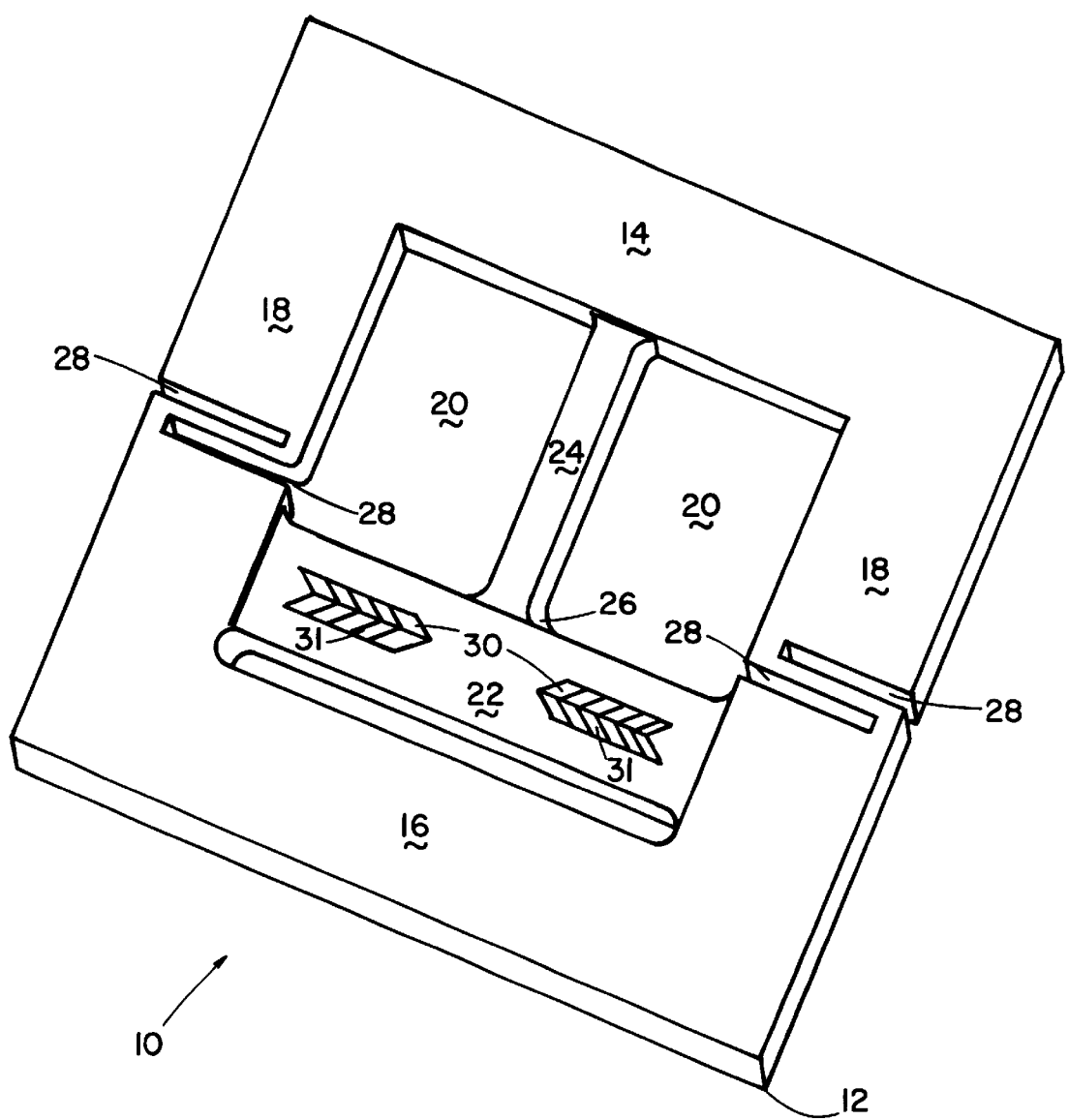
FIG. 2 is a perspective view of the first embodiment shown in FIG. 1.

A first embodiment 10 of the beam strain gauge is shown in FIGS. 1–2. The first embodiment 10 is a geometric pattern which defines a frame 12. The frame 12 includes a top leg 14, bottom leg 16 and two side legs 18, all of which form an open area 20 in the center of the frame 12. A thin web beam 22 spans a portion of the open area 20 in the lower half of the open area 20. A thin loading column 24 is interconnected between the inner side of the top leg 14 of the frame 12 and the top of the beam 22. The connection point 26 of the loading column 24 at the beam 22 is at the midpoint of the beam's length. Each side leg 18 has two flexure openings 28, but is not limited to just two. These flexure openings 28 allow the side legs 18 to flex under a load, thereby allowing the loading column 24 to absorb the load and deflect the beam 22.

Four strain gauges 30, 31 wired in a standard full Wheatstone bridge circuit are placed on the beam 22 to measure shear strain in the beam 22. Use of the full Wheatstone bridge circuit requires that two of the gauges 30 be place on the upper half of the beam 22 and the other two gauges 31 be placed on the lower half of the beam 22 as shown in FIGS. 1–2. A dotted line shown in FIG. 1 represents the longitudinal axis 32 of the beam 22, which defines the upper and lower halves of the beam 22. To receive the optimum output signal for shear strain in the beam 22, all the gauges 30, 31 should be placed at a position that is forty-five (45) degrees in angle with respect to the longitudinal axis 32 of the beam 22, where the gauges in each half are oriented one-hundred and eighty (180) degrees relative to each other and corresponding gauges on either side of the longitudinal axis 32 are oriented ninety (90) degrees relative to each other, as shown in FIG. 1.

The full Wheatstone bridge circuit can be used for strain measurement of the beam 22 in bending due to the placement of the gauges 30, 31 as described above. This gauge placement always positions two of the gauges in a field of the compressive stress and the other two in a field of tensile stress when the beam 22 is defected by the loading column 24. It is known that the disadvantage of using more than one strain gauge to measure strain is eliminated when positioning the gauges 30, 31 on a beam 22 as described above due to opposite and equal fields of stress on either side of the longitudinal axis 32 during deflection of the beam 22. Therefore, shear strain in the beam 22 during the defection can be measured by a full Wheatstone bridge circuit when the gauges 30, 31 are positioned as described above. Using the above gauge placement to incorporate this circuit, the method of converting the shear strain measured by the circuit into the strain of the material will be further developed.

All embodiments of the beam strain gauge can be mounted in the traditional way of gluing gauges, whereby only the top and bottom legs 14,16 of the frame 12 are bonded with adhesive to the surface of the material (not shown) to be measured. Another method of bonding, which is effective with silicon chips, is to etch or remove some of the material of the chip in a small area on the side of the frame 12 that does not contact the material to be measured. This etched area will be referred to as an etched bonding area 34. The material to be measured is then coated with silicon using thin film deposition. The beam strain gauge can then be placed on the material surface and a laser beam applied to each etched bonding area 34. The heat from the laser beam acts to fuse the etched bonding area 34 to the thin film of silicon, thereby securing the frame 12 to the material surface with a molecular bond. This eliminates the need to use adhesives and reduces error due to creep. Also, the frame 12 could be secured to the material to be measured by using simple fasteners (not shown), such as screws.

The operation of the first embodiment 10 of the beam strain gauge is based on the theory of shear stress and shear strain in a beam during bending. It is known that when a beam is put into bending, a tensile stress is induced into one half of the beam and a compressive stress is induced in the other half of the beam, where the beam is divided into halves by its longitudinal axis. The center of the beam between the two halves undergoes a shear stress ($\tau$) which is know in the art to be mathematically related to shear strain ($\gamma$) of the beam by the following equation.

$$\tau = G\gamma \qquad \text{Equation (1)}$$

Whereby, G is the shear modulus of the beam, which is dependent upon the properties of the beam and can be determined by relationships known in the art of beams in bending. Therefore, when the beam 22 is defected, the shear strain ($\gamma$) can be measured by a full Wheatstone bridge circuit positioned on the beam 22 as described above and inputted into equation (1) to determine shear stress ($\tau$).

The strain in a material is known to be the change in the material's length relative to the original length of the material. Strain is a dimension-less quantity denoted by ($\epsilon$) and the equation for strain is known in the art to be as follows.

$$\varepsilon = \frac{\Delta L}{L}, \qquad \text{Equation (2)}$$

The strain of a material to be measured can also be calculated as the change in displacement ($\Delta L_g$) of the top leg 14 of the frame relative to the bottom leg 16 of the frame 12 divided by the original distance ($L_g$) between the top and bottom legs 14, 16. The displacement ($\Delta L_g$) will occur because the top and bottom legs 14, 16 are fixed to the material and both legs 14, 16 will move as the length of the material changes. $L_g$ and $\Delta L_g$, can be inputted into equation (2), because it is a known relationship for strain that $\Delta L_g$ divided by $L_g$ will be equal to $\Delta L$ divided by L.

When strain is placed on the material and therefore on the first embodiment 10, the distance between the top and bottom legs 14, 16 increases or decreases. This increase or decrease depends on whether the top and bottom legs 14, 16 move away from each other or towards each other when strain is imposed on the material. During measurement, the side legs 18 deflect due to the flexure openings 28 allowing the loading column 24 to apply the majority of the displacement load to the middle of the beam 22 as the distance between the top and bottom legs 14, 16 changes. This displacement load deflects or bends the beam 22, thereby generating shear stress in the location of the strain gauges 30, 31 on the beam 22. The deflection of the beam 22 will be equal to the change in distance between the top and bottom legs 14, 16, which is $\Delta L_g$. The strain gauges 30, 31 on the beam 22 during deflection change resistance from the shear strain in beam 22, thereby generating an electrical signal of the shear strain in the full Wheatstone bridge circuit. The shear strain of the beam 22 is proportional to the strain of the material and can be used with the following known relationships to determine that strain.

$$\tau = \frac{Wh^2}{8I}, \qquad \text{Equation (3)}$$

$$\Delta L_g = \frac{-WL_B^3}{192EI}, \qquad \text{Equation (4)}$$

In the above equations W is the load applied to the beam 22; h is the height of the beam 22 prior to bending as shown in FIG. 1; I is the area moment of inertia about the centroidal axis of the beam cross section;, $\Delta L_g$ is the distance of defection of the beam 22 by the loading column 24 which also equals the change in distance between the top and bottom legs 14, 16; $L_B$ is length of the beam 22 prior to bending as shown in FIG. 1; and E is the modulus of elasticity of the beam material. E and I are known quantities which depend on the properties of the beam 22 and can be determined by relationships known in the art of beams in bending. Equation (3) is a known equation for a beam in bending. Equation (4) is a known equation for a beam that is fixed at its ends and put in bending. The strain of the material to be measured using the first embodiment 10 is calculated as follows. The signal of shear strain (γ) from the full Wheatstone Bridge circuit is inputted into equation (1) in order to solve for τ. Next, τ is inputted into equation (3) with known quantities h and I to solve for W. Then, W is inputted into Equation (4) with known quantities 1, E and I of the beam to determine $\Delta L_g$. Finally, strain of the material can be determined by inputting $\Delta L_g$ and $L_g$ into equation (2).

It should be noted that the discussion of the above equations is intended to explain the operational theory behind the beam strain gauge having a beam in bending. Once any embodiment of the beam strain gauge is produced, whether it be from metal or silicon crystal, the gauge can be mounted in a clamping fixture and calibrated. Calibration is performed by causing the displacement of the top and bottom legs 14, 16 in relation to each other, while correlating that change in distance with the output signal received from the full Wheatstone bridge circuit. Therefore, the use of the above mentioned equations is no longer required after the gauge has been fabricated and calibrated.

The concept of using the first embodiment 10 was tested with a prototype cut from aluminum having a thickness of 0.200 inches and a beam thickness of 0.020 inches to verify the operation of the basic concept. Etched foil strain gauges were glued to the beam of the aluminum prototype. When the prototype was tested, it was found to be linear, whereby error values were in the 0.25 % range. The prototype was found to be insensitive to transverse strain, as it was not measurable. Also, the prototype was found to have inherent errors in the 0.5% range as compare to the typical wire wound or metal foil gauges which have inherent errors in the 5.0% range. The inherent errors mentioned are attributed to hysteresis, non-linearity and transverse strain. It appears the most of the reduction in error of the prototype compared to other strain gauges is due to the insensitively to the transverse strain.

Though the first embodiment prototype was aluminum, all embodiments of the beam strain gauge are intended to be etched out of a silicon wafer with the strain gauges of the full Wheatstone bridge circuit implanted on the beam portion of the wafer using standard semi-conductor chip technology. This allows the beam strain gauge to be designed to stay within the linear range of the full Wheatstone bridge circuit. Another advantage in using semi-conductor chip technology is that the surface area surrounding the working parts of the beam strain gauge is available for implanting additional electronic circuits. Some examples are circuits for amplification, temperature compensation, zero offset adjustments, frequency filters, noise filters, voltage or current excitation stabilization and interface electronics for communication or analog/digital conversion.

Figure 3:
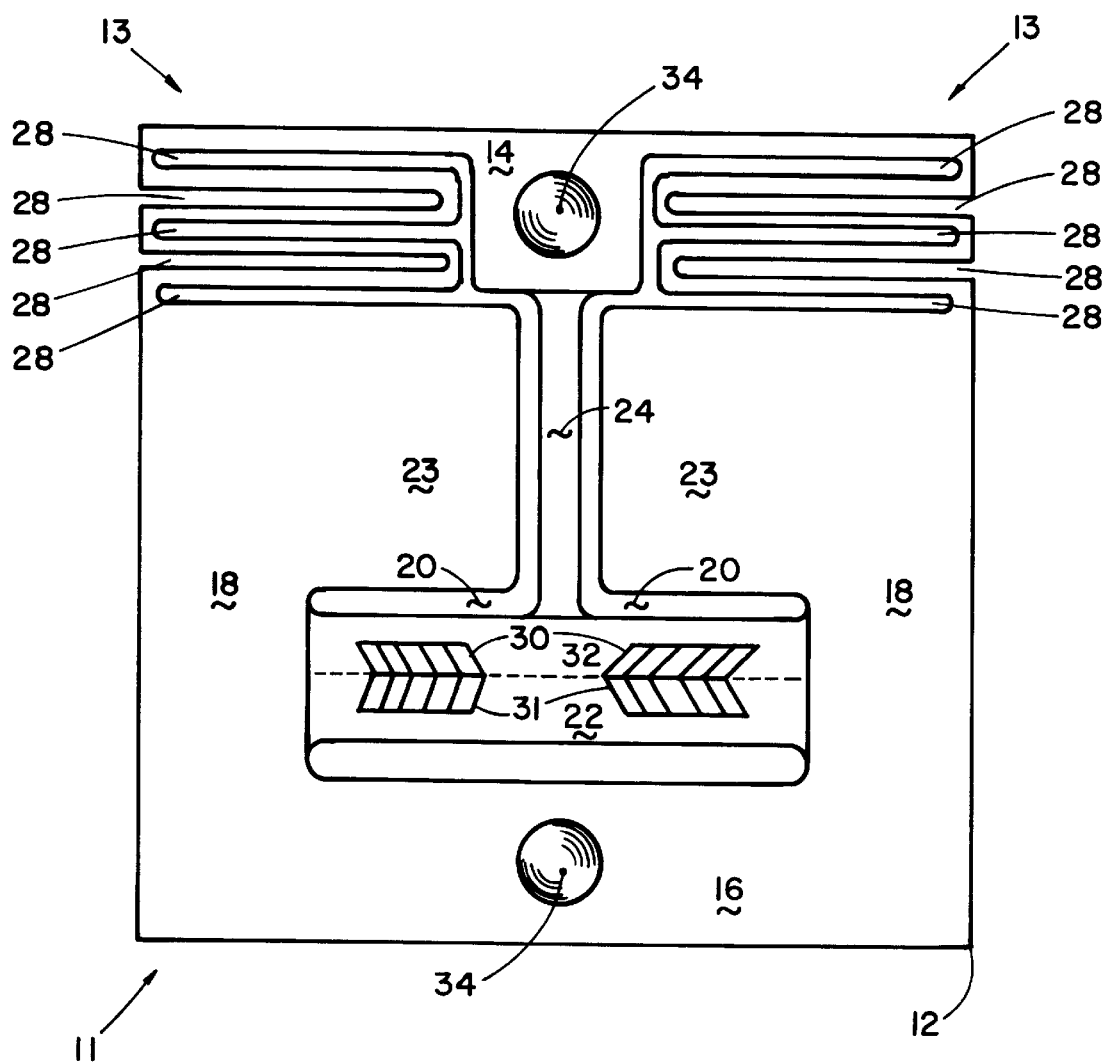
FIG. 3 is a top view of a variation of the first embodiment shown in FIG. 1.

FIG. 3 shows an embodiment 11 which is a variation of the first embodiment 10. The flexure openings 28 are positioned at corner points 29, where the top leg 14 meets the side legs 18. This allows for less material to be removed to form the open area 20, thereby providing additional space 23 for electronics on the side legs 18 and in the open area 20.

Also, though the final form of the beam strain gauge embodiments are intended to be made using silicon chip technology, they do not necessarily need to be made from silicon. They could be made from any semi-conductor material that can be doped and etched. They could also be made from thin metal or foil using thin film deposition techniques to add the Wheatstone bridge circuit of strain gauges to the beam. Though this would give an all metal bridge with a reduced output signal due to the material used, it would still provide a device having four times the output signal of the wire wound or etched foil gauges used in a quarter bridge circuit configuration. It is envisioned that the beam strain gauge could be made from any material and thickness and still provide advantages over traditional strain gauges due to the principals behind its operation. The following paragraphs will describe other embodiments of the invention, where like numbers in each Figure serve the same purpose.

Figure 4:
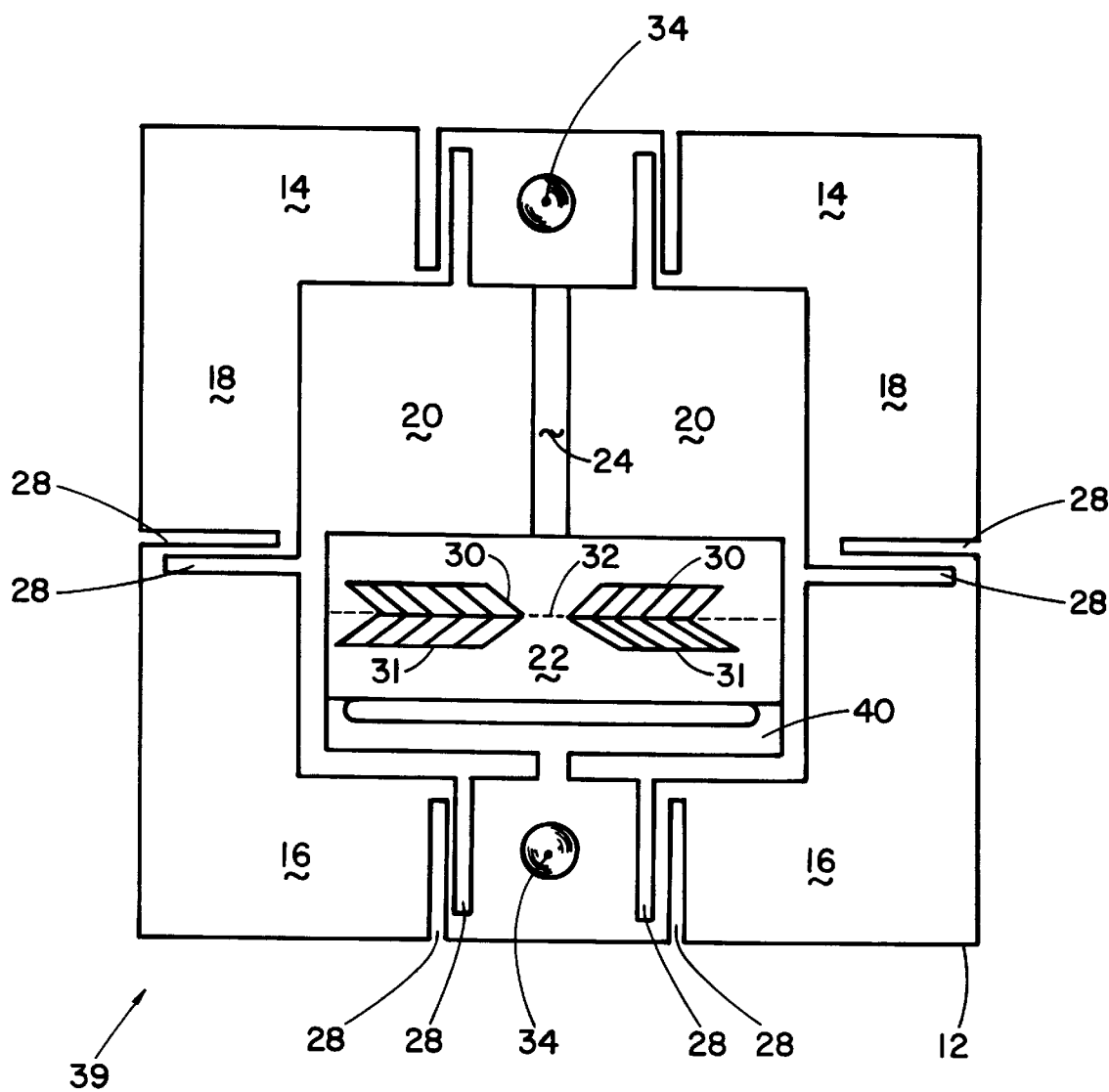
FIG. 4 is top view of a second embodiment of the beam strain gauge.

One limitation of the first embodiment 10 is the measurable strain range when the gauge is made of silicon. This is because of the brittle nature of silicon, whereby the beam will fracture after a deflection beyond it elasticity limitations, which is usually in the range of 100 µ strain. The typical wire-wound or etched-foil strain gauge can measure strains in the 1500 to 2000 µ strain range, but in this range the gauges fatigue with repeated cycles of use. A second embodiment 39 allows the increase of the strain range, where each end of the beam 22 is attached to a leaf spring 40 as shown in FIG. 4. The leaf spring 40 is attached at its center to the inner side of the bottom leg 16 of the frame 12. The leaf spring 40 will have a linear load with displacement, so in turn the load applied to the beam 22 will also be linear with displacement. This frees the beam 22 from both side legs 18, while still having the beam 22 fixed at its ends. The embodiment 39 introduces a great deal of flexibility, such as the positioning of the flexure openings at or below the beam 22 (not shown). Leaf springs 40 (not shown) can be stacked on each other between the frame 12 and the beam 22, allowing even greater displacement without fracturing the beam 22. The stiffness of the leaf spring 40 can be matched to the beam 22 to ensure that the response by the full Wheatstone bridge circuit remains in its linear range. Therefore, the embodiment 39 of the beam strain gauge can be designed to meet a large range of strains while remaining within material limitations. Also shown are flexure openings 28 at the top and bottom legs 14, 16. These flexure openings 28 are not necessary, but reduce the possibility of fracture of the frame 12 when it is under a large amount of strain. Such flexures openings 28 will also be shown on other embodiments of the beam strain gauge for this purpose. It should be noted on the embodiment 39 and others to follow, that the etched bonding areas 34 are placed based on the number and positioning of the flexure openings 28, so that the displacement relationship between the top and bottom legs 14, 16 is maintained.

Figure 5:
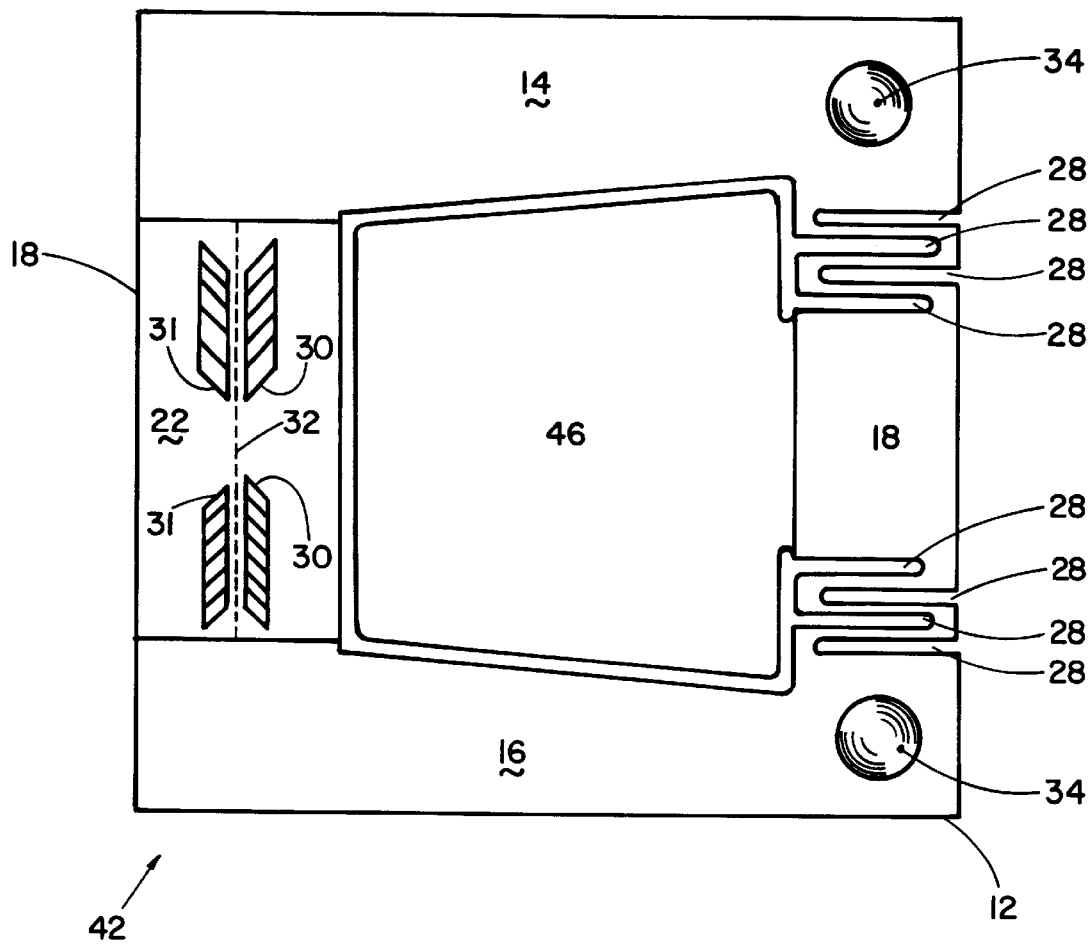
FIG. 5 is a top view of a third embodiment of the beam strain gauge.
Figure 6:
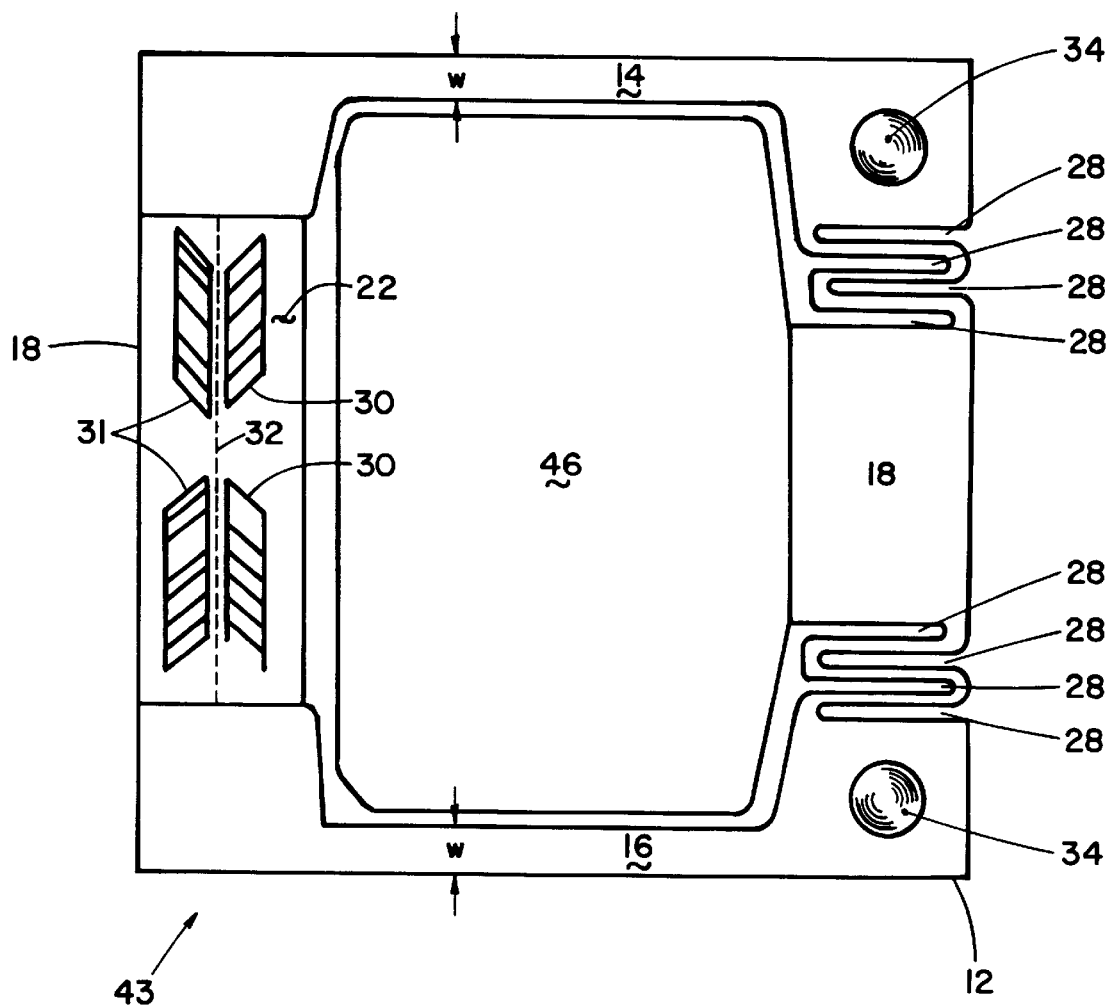
FIG. 6 is a top view of a variation of the third embodiment shown in FIG. 5.

FIGS. 5 shows a third embodiment 42 of the beam strain gauge. In this embodiment 42, one of the side legs 18 of the frame 12 is etched to produce the beam 22 with the full Wheatstone bridge circuit. The other side leg 18 includes two sets of flexure openings 28 etched into it. The two etched bonding areas 34 are located as shown on the top and bottom legs 14, 16 to allow maximum movement of the legs 14, 16. When strain is applied, the top and bottom legs 14, 16 will move away or towards each other, similar to the first embodiment 10. Movement of the legs 14, 16 is allowed due to the flexure openings 28. The legs 14, 16 apply an equal but opposite moment to each end of the beam 22 during movement. This will produce bending in the beam 22 and a shear strain signal from the bending will be produced by the full Wheatstone bridge circuit. The embodiment 43 shown in FIG. 6 is similar to embodiment 42, except the width (w) of the top and bottom legs 14, 16 is etched thinner to allow for an increase in their movement. This reduces the sensitivity of the beam 22, therefore, increasing the range of strain that can be measured. Also, both embodiments 42, 43 include an implantation area 46, which is not a necessary part of the side leg 18, but remains only to provide additional space for the electronics.

Figure 7:
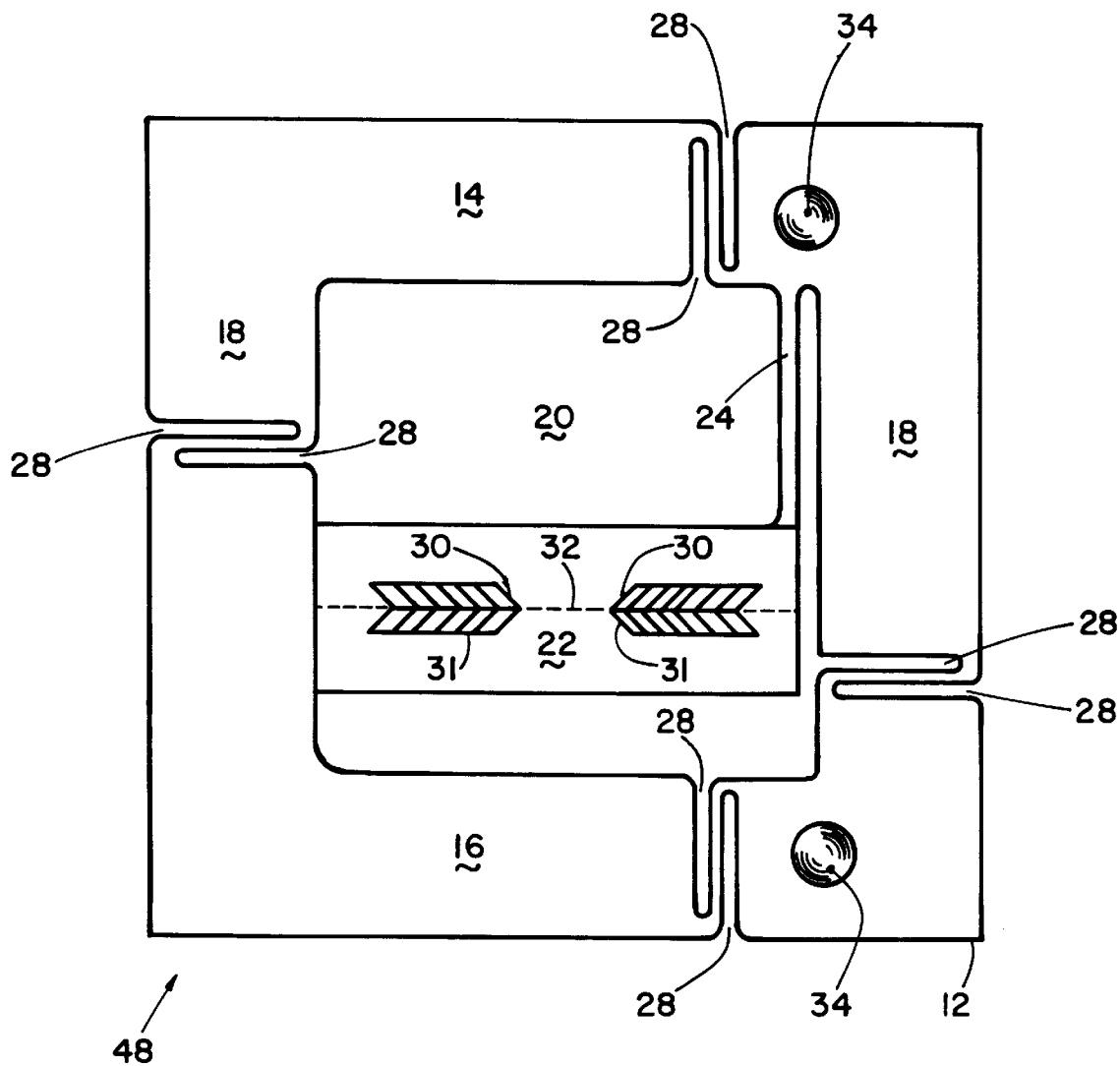
FIG. 7 is a top view of a fourth embodiment of the beam strain gauge.
Figure 8:
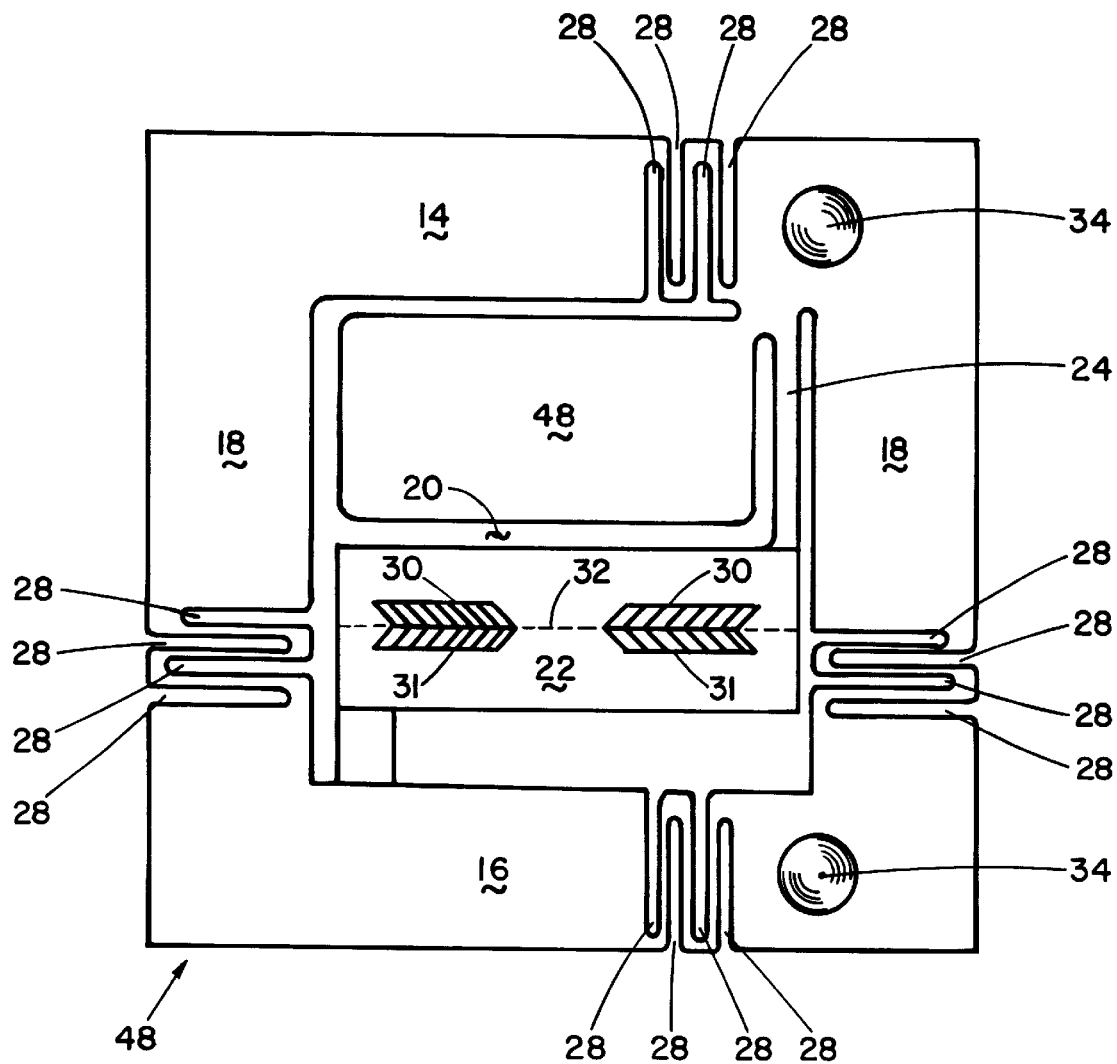
FIG. 8 a top view of a variation of the fourth embodiment shown in FIG. 7.

FIGS. 7–8 shows a fourth embodiment 48 of the beam strain gauge, where the beam 22 is not fixed by both side legs 18. The loading column 24 is located at one end of the beam 22 and the other end of the beam 22 is attached to either the side leg 18 (FIG. 7) or the bottom leg 16 (FIG. 8). When designing embodiment 48, equation (4) must be replace by an equation for a beam that is fixed at only one end and put into bending, as is known for a beam in bending. The beam strain gauge of FIG. 8 also illustrates that for this embodiment 48 an implantation area 46 can be allowed to remain in the open area 20 during etching.

In embodiments 1–4 of the beam strain gauge, the beam 22 was put into bending to generate a shear strain signal. In the following embodiments, the theory of a beam in tension or compression is incorporated to measure strain. As is known, a full Wheatstone bridge circuit must have two signals from gauges in the positive direction and two in the negative direction for the circuit to generate a useable strain signal. This is usually accomplished by placing two strain gauges in a tension strain field and two gauges in a compression strain field. When tension and compression are a direct force on a beam and not caused by bending, the signal from the full Wheatstone bridge circuit will be the actual strain of the material to be measured. As will be seen further, the following embodiments will utilize this as a basis for operation when there is no beam in bending.

Figure 9:
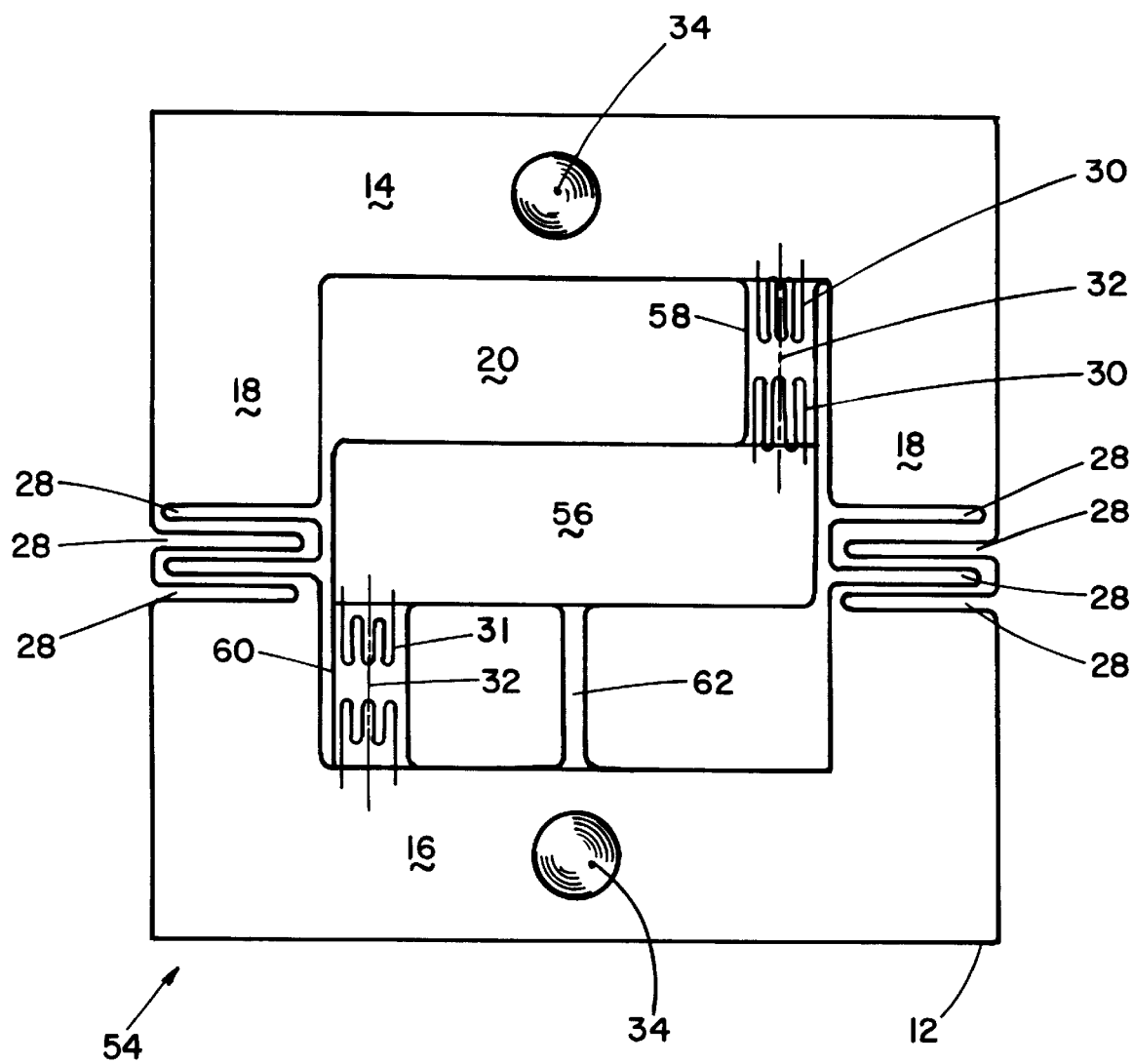
FIG. 9 is a top view of a fifth embodiment of the beam strain gauge.

FIG. 9 shows a fifth embodiment 54 having a frame-beam configuration that will produce both the compression and tension strain fields directly without inducing shear strain in a beam. This is accomplished by using flexures openings 28, a rocking beam 56, a tension beam 58 and a compression beam 60. The open area 20 of the frame 12 is spanned horizontally by the rocking beam 56 that is not attached to the side legs 18 of the frame 12. At one end of the rocking beam 56, the tension beam 58 is attached at ninety (90) degrees to the longitudinal axis 32 of the rocking beam 56. The tension beam 58 is also attached to the inner side of the top leg 14 of the frame 12. At the other end of the rocking beam 56 is attached the compression beam 60, which is attached to the inner side of the bottom leg 16 of the frame 12 on the opposite side from the tension beam 58. Attached at the center of the rocking beam 56 is narrow pivot column 62. The pivot column 62 is also attached to the inner side of the bottom leg 16. The tension beam 58 and the compression beam 60 are both etched thinly to increase strain sensitivity. Flexure openings 28 are etched in each of the side legs 18 and serve the same purpose as the first embodiment 10. Two strain gauges are placed on each the tension and compression beams 58, 60 using standard techniques. The primary axis of the strain gauges 30, 31 are aligned with the longitudinal axis 32 15 of the tension and compression beams 58, 60. The four strain gauges 30, 31 are wired into a standard Wheatstone bridge circuit. The frame 12 is mounted to the material in the same manner as the first embodiment 10.

When the fifth embodiment 54 is under strain and there is displacement of the top leg 14 from the bottom leg 16, tension is generated in the tension beam 58. This tension is also present in the pivot column 62. The offset of the tension beam 58 from the pivot column 62 creates a rotating moment of the rocking beam 56 about the pivot column 62. This moment forces the compression beam 60 into compression, thereby generating the opposing strain field needed by the Wheatstone bridge circuit to generate an output signal. It is noted that when displacement of the top leg 14 is towards the bottom leg 16, the tension and compression beams 58, 60 reverse roles and functions. This embodiment 54 of the beam strain gauge has all the same advantages and manufacturing options of the other embodiments. Leaf springs (not shown) can be utilized similar to the aforementioned leaf springs 40 of embodiment 39 at one or both ends of the tension beam 58 and the compression beam 60 to prevent the beams 58, 60 from fracturing under the load.

Figure 10:
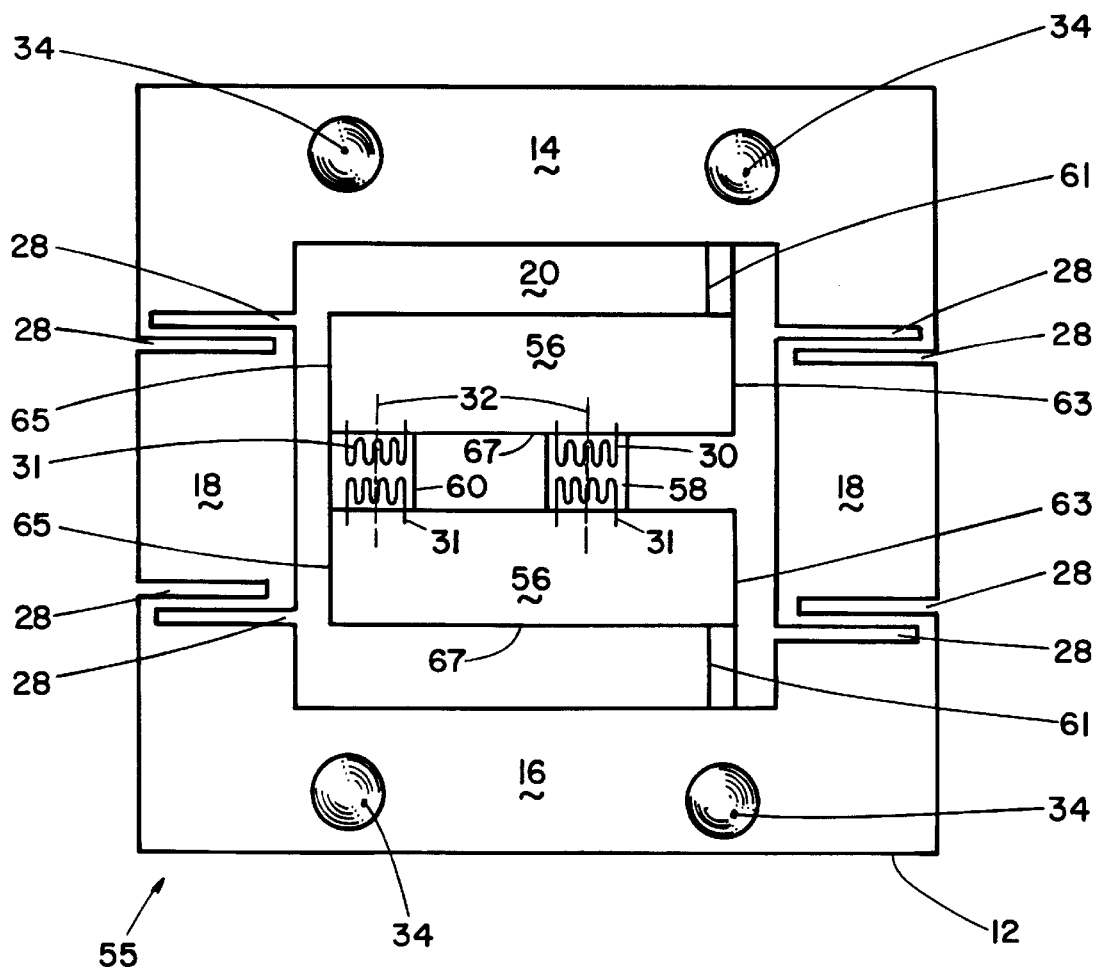
FIG. 10 is a top view of a variation of the fifth embodiment shown in FIG. 9.

FIG. 10 shows embodiment 55 which is a variation of embodiment 54. In embodiment 55, an additional rocking beam 56 has been added and the tension and compression beams 58, 60 have been repositioned between the two rocking beams 56. The beams 58 and 60 must be separated by midpoint 67 of rocking beams 56. The pivot column 62 has been replaced by loading columns 61 between the frame 12 and end 63 of the rocking beams 56 as shown in FIG. 10. When the top and bottom legs 14, 16 move away from each other due to strain, the loading columns 61 pull on the rocking beams 56. The pulling by the loading columns 61 thereby rotates the rocking beams 56. During this rotation the ends 63 of the rocking beams 56 move away from each other and ends 65 of the rocking beams 56 move towards each other. The rotation of the beams 56 applies tension in the tension beam 58 and compression in the compression beam 60. Gauges 30, 31 are mounted to the tension and compression beams 58, 60 in the same manner as embodiment 54. The beams 58, 60 will reverse roles as in embodiment 54 when the top and bottom legs 14, 16 move toward each other. This is because the loading columns 61 push on the beams 56 and the ends 63 move towards each other, where ends 65 move away from each other. Also, embodiment 55 is shown with two etched bonding areas on each leg 14, 16, which can be employed in any of the embodiments disclosed in this specification. The addition of an etched bonding area on each leg 14, 16 aids in preventing the legs 14, 16 from rotating when strain is applied.

Figure 11:
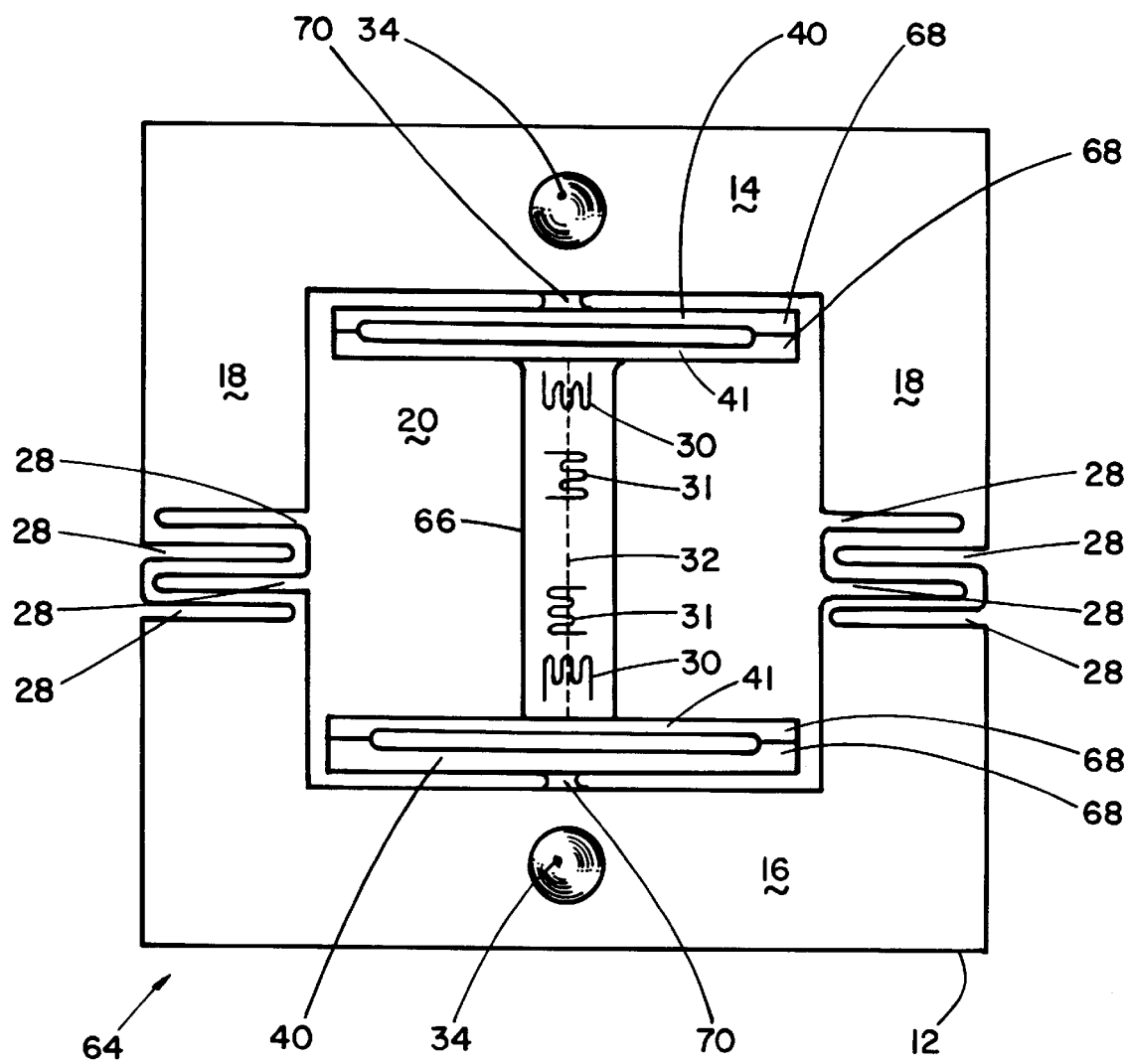
FIG. 11 is a top view of a sixth embodiment of the beam strain gauge.

FIG. 11 shows a sixth embodiment 64 which utilizes a single tension/compression beam 66. In this embodiment 64, the open area 20 of the frame 12 is spanned vertically with the tension/compression beam 66. At each end of the tension/compression beam 66 is a pair of leaf springs 40, 41 fastened together at tips 68. These leaf springs 40, 41 are used to reduce the likelihood of fracture of the tension/compression beam 66, but are not necessary for smaller strain measurements. Each leaf spring 40 is further attached to the top and bottom legs 14, 16 respectively by a short column 70. The two side legs 18 of the frame 12 have flexure openings 28 similar to the first embodiment 10. Four strain gauges 30, 31 are placed on the tension/compression beam 66. The primary axis of two of the gauges 30 runs parallel to the longitudinal axis 32 of the tension/compression beam 66 and the primary axis of the other two gauges 31 runs perpendicular to the longitudinal axis 32. When strain has is applied, the flexure openings 28 deflect allowing the majority of the load to be transmitted through the leaf springs 40, 41 to the tension/compression beam 66. This puts the tension/compression beam 66 into tension or compression, depending on the movement of the top and bottom legs 14, 16. Assuming a tension load, the two strain gauges 30 aligned with the longitudinal axis 32 of the tension/ compression beam 66 will increase in resistance in proportion to the tension applied. The two strain gauges 31 transverse to the longitudinal axis 32 of the tension/compression beam 66 will decrease in resistance from the compression generated due to a theory known as Possion ratio effect. The four gauges 30, 31 are wired as a full Wheatstone bridge circuit, where the transverse aligned gauges 31 are wired as compression gauges and the longitudinal aligned gauges 30 are wired as tension gauges.

Figure 12:
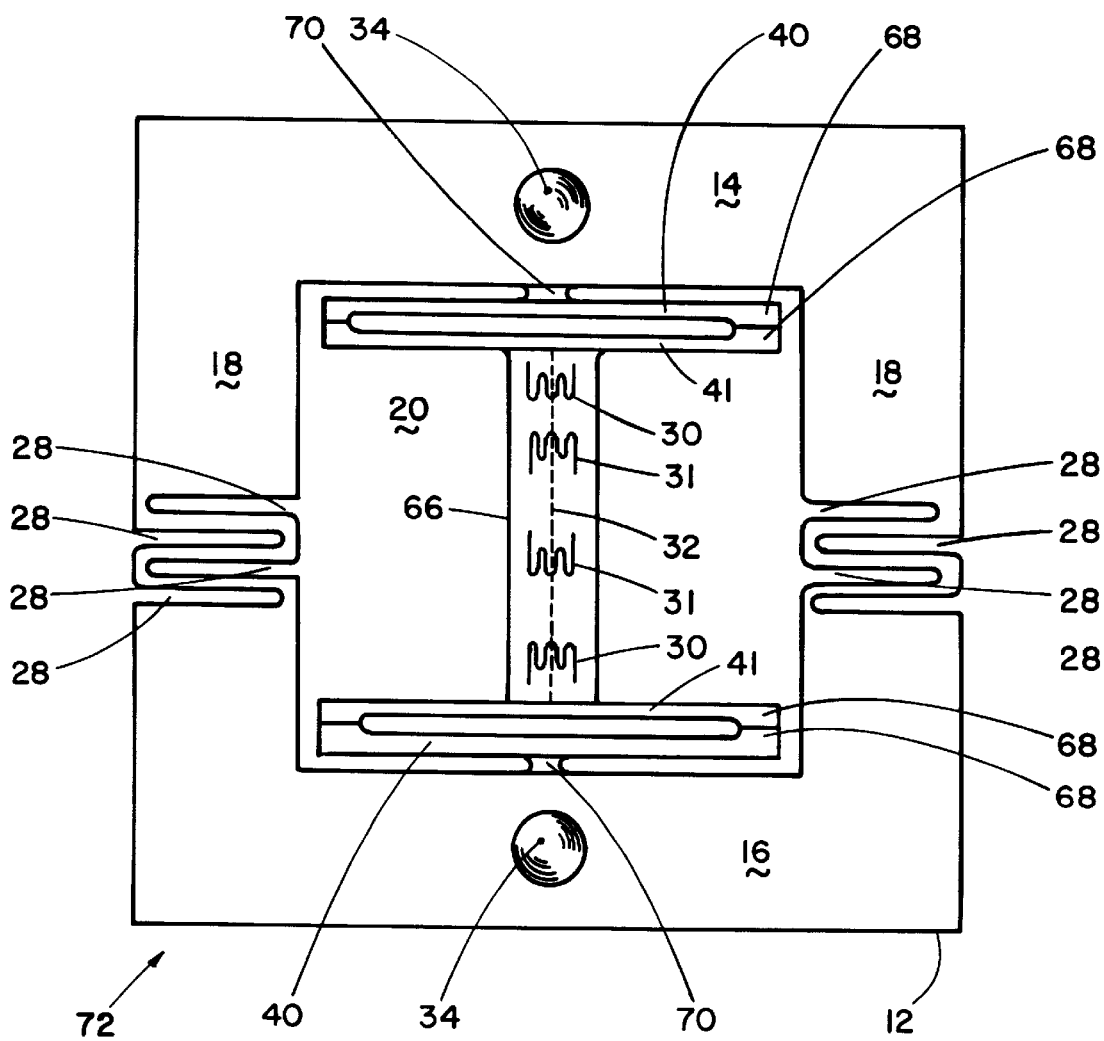
FIG. 12 is a top view of a variation of the sixth embodiment shown in FIG. 11.

FIG. 12 shows an embodiment 72, which is a version of the above embodiment 64, where the strain gauges 30, 31 mounted to the beam 66 are produced using semiconductor technology. This configuration is identical to embodiment 64, except where the orientation of the strain gauges 30, 31 has been changed. All four gauges 30, 31 in embodiment 72 are aligned with the longitudinal axis 32 of the tension/compression beam 66. Two of the gauges 30 are doped P (positively) and the other two gauges 31 are doped N (negatively). The P and N doped semi-conductor strain gauges 30, 31 respond to strain in an opposite manner. The two N doped gauges 31 are wired into a full Wheatstone bridge circuit as the compression gauges and the two P doped gauges 30 are wired as the tension gauges. The opposite resistance changes required for the full Wheatstone bridge circuit to function are generated by the different response of the two types of doping rather than opposite strain fields.

Figure 13:
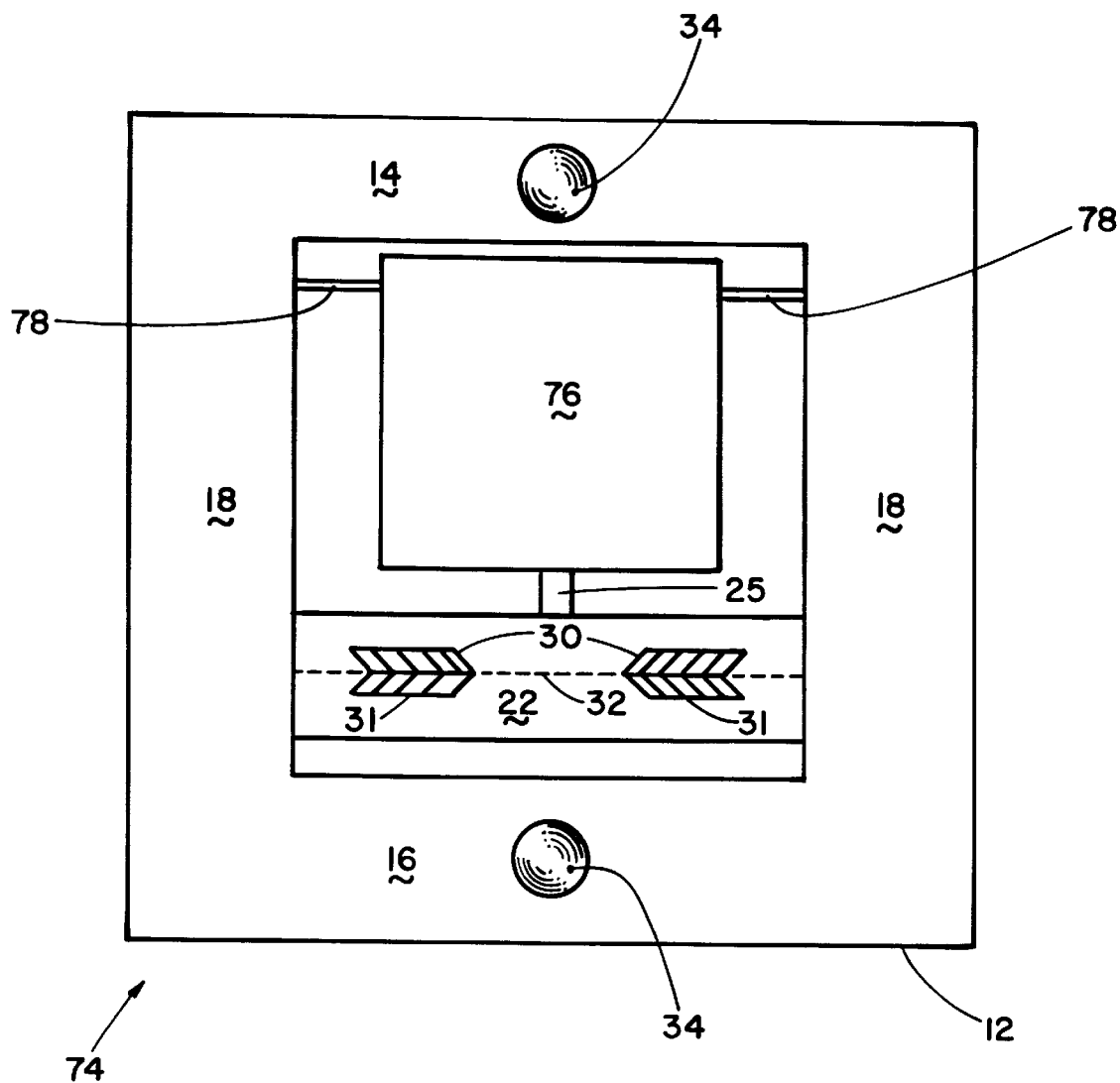
FIG. 13 a top view of an accelerometer.
Figure 14:
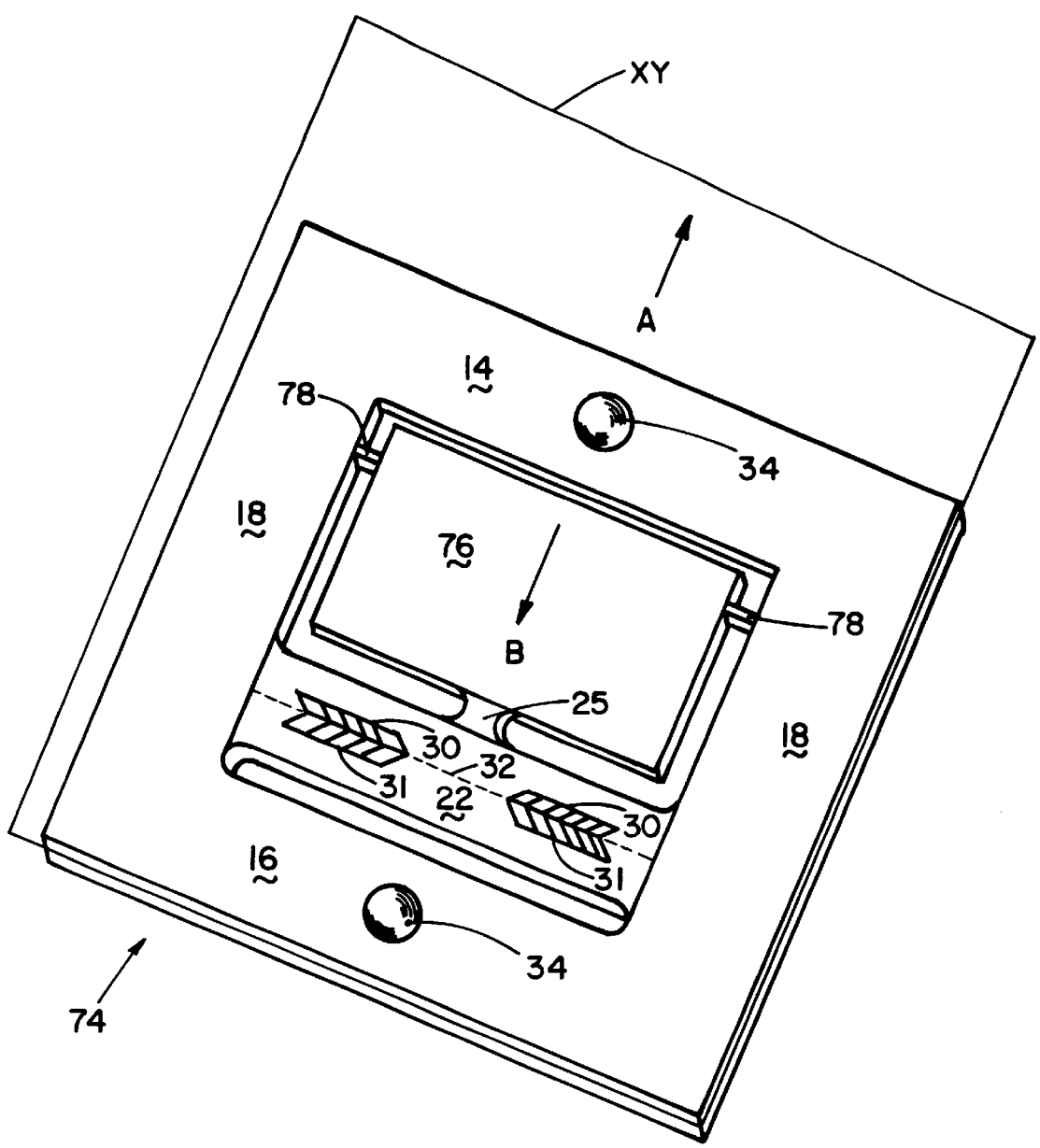
FIG. 14 is a perspective view of the accelerometer shown in FIG. 13.

A seventh embodiment incorporates the beam in bending configuration of the first embodiment 10 to act as an accelerometer 74 as shown in FIGS. 13–14 The accelerometer 74 has a frame 12 which is the same as the first embodiment 10 without the flexure openings 28. In place of the loading column 24, a mass 76 of silicon is positioned in the open area 20 above the beam 22. The bottom of the mass 76 is attached to the beam 22 by a shorter loading column 25. The mass 76 is also suspended from the side legs 18 of the frame 12 using two support strips 78 of silicon extending from the frame 12 to the mass 76. The mass 76 should be the same thickness as the frame 12 to have the maximum mass available. The accelerometer 74 is configured to be accelerated in the direction of arrow A in plane XY, where plane XY coincides with the surface of the accelerometer 74 as shown in FIG. 14. The mass 76 applies a force to the beam 22 in the direction shown by arrow B which is opposite arrow A during acceleration. The two support strips 78 are oriented so they will be weak in the direction of arrow B to induce all of the force from the mass 76 to the beam 22. The support strips 78 are stiff in all other directions to constrain the mass 76 so it can only move in direction of arrow B, making the accelerometer 74 sensitive to accelerations only in the direction of arrow A.

The theory behind the accelerometer is that the force on the beam 22 resulting from the acceleration of the mass 76 will put the beam 22 into bending, thereby creating a shear strain signal. This shear strain signal can be inputted into equations (2) and (3) in order to solve for W. W is the force (F) which can be substituted into the equation F=ma, where the mass of the silicon is known. Then, the acceleration can be found by solving for (a).

Figure 15:
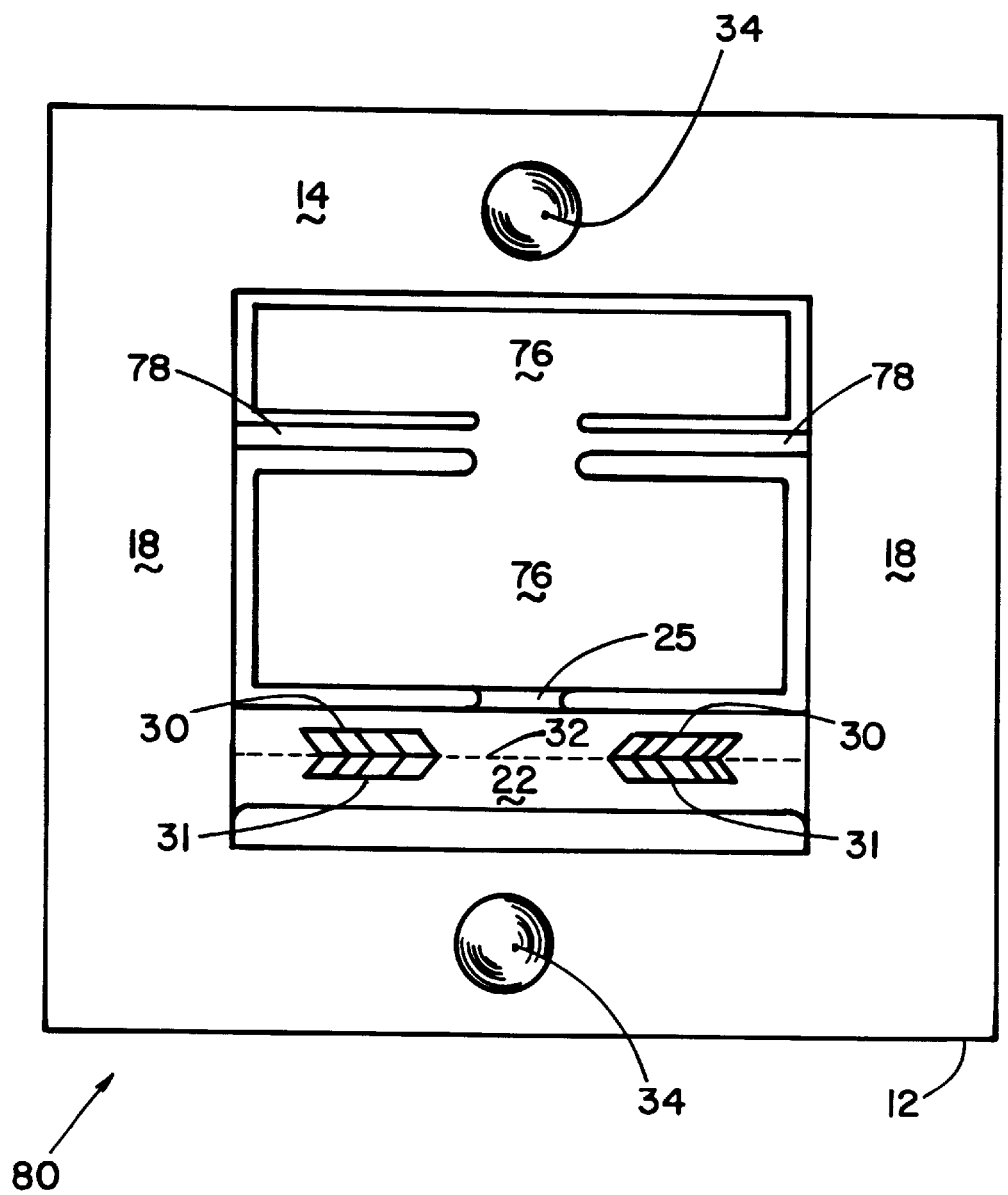
FIG. 15 a top view of a variation of the accelerometer shown in FIG. 13.

FIG. 15 shows an accelerometer 80 which operates in the same manner as the accelerometer 74. The two differences are that the support strips 78 are relocated to incorporate a larger mass 76 and the mass 76 is shaped to incorporate longer support strips 76. The larger mass 76 increases sensitivity of the accelerometer, while having longer support strips 78 also increases the sensitivity. Both versions of the accelerometer 74, 80 allow for implantation of additional circuitry on the frame 12.

Figure 16:
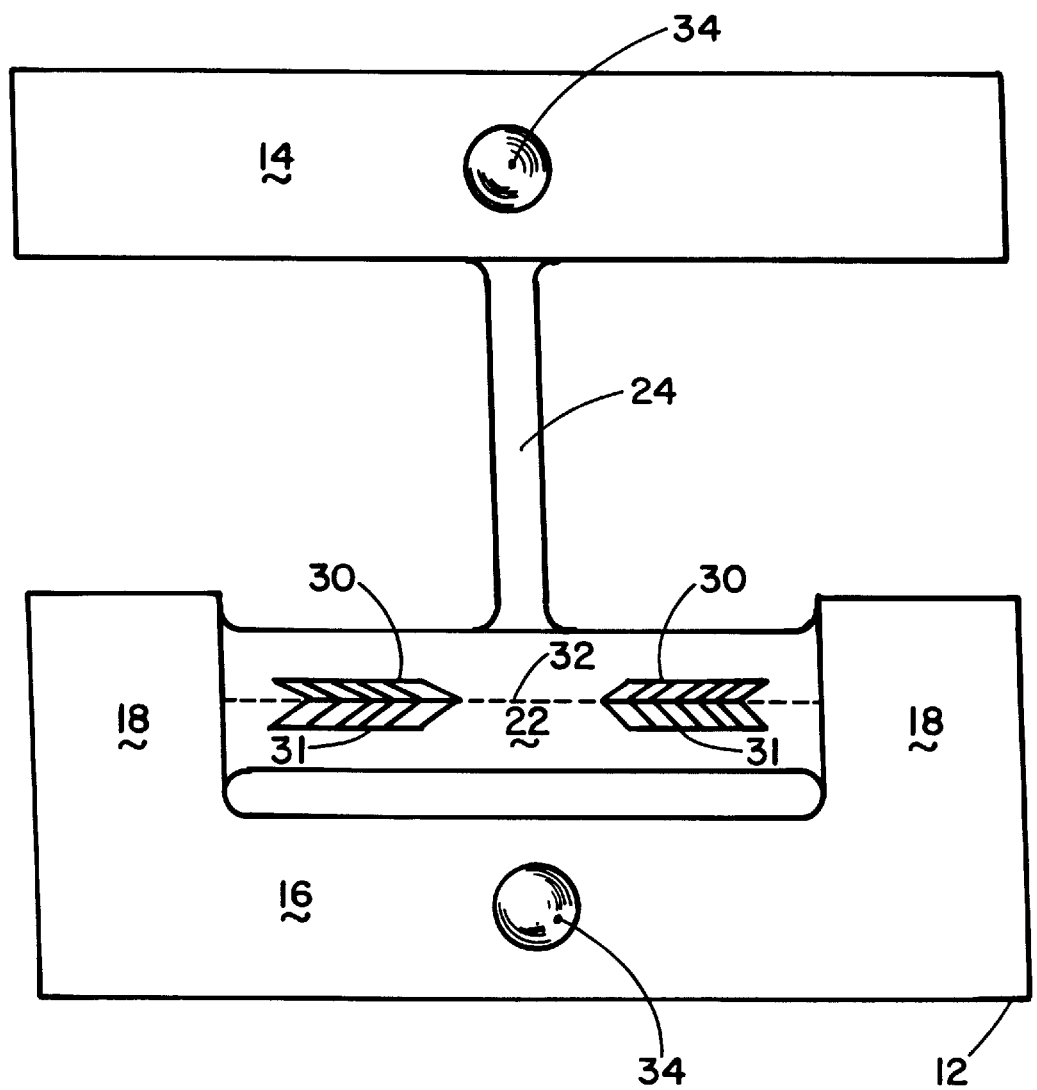
FIG. 16 is a top view of a variation of the first embodiment shown in FIG. 1.

All of the above mentioned embodiments employ some form of side legs 18, which help define the frame 12 of the beam strain gauge. One of the main purposes of the side legs 18 is to provide surface area to interconnect the top leg 14, bottom leg 16, beam or beams and the components used to manipulate the beam or beams during strain. The legs 18 and therefore the flexure openings 28 are not specifically necessary for operation of the beam strain gauge, but they allow the embodiments to be handled without being destroyed due to their thin nature when manufactured as a silicon chip. Therefore, all of the above mentioned embodiments can be manufacture without the side legs 18 interconnecting the top and bottom legs 14, 16 or even without the side legs 18 in their entirety, while maintaining their operational nature. An example of this is shown in FIG. 16, which illustrates the embodiment 10 without side legs 18 interconnecting the top and bottom legs 14, 16. As can be seen from FIG. 16 for this version of embodiment 10, a shorter version of the side legs 18 is required to fix the beam 22 at both ends. The exception to the aforementioned is embodiments 42 and 43 which must retain the side leg 18 that is also the beam 22, but does not require the side leg 18 between the flexure openings 28.

In all of the above discussed embodiments, a full Wheatstone bridge on the beam(s) was presented which includes four active resisters or strain gauges which change when strain is applied. It is possible to practice the above embodiments of the invention with the know relationships of a half or quarter Wheatstone bridge on the beam(s) which have two or one active resistors, respectively. Is also possible to practice the above embodiments using a single resistor on the beam(s) which has a know relationship of value of resistance to strain applied. It is believe that using any other configuration than a full Wheatstone bridge will be less accurate, but still usable, if the accuracy of the full Wheatstone bridge is not required.

While different embodiments of the invention has been described in detail herein, it will be appreciated by those skilled in the art that various modifications and alternatives to the embodiment could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A beam strain gauge comprising:

a top leg;

a bottom leg below said top leg;

two side legs, each connected to and extending from said bottom leg towards said top leg;

a beam having two ends and a longitudinal axis dividing said beam into a first half and a second half, where said beam is connected to and fixed between said side legs at each of said two ends;

a loading column interconnecting said beam to said top leg, said loading column fixed to said beam at a location between said two ends of said beam; and at least one resistor mounted on said beam.

2. The beam strain gauge of claim 1, further including space on at least one of said top leg, bottom leg and side legs for the mounting of electronics.

3. The beam strain gauge of claim 1, wherein said strain gauge is of a semi-conductor material.

4. The beam strain gauge of claim 1, wherein said side legs interconnect said top and bottom legs, thereby forming a frame about the beam and further including at least one flexure opening in each of said side legs to allow each side leg to flex as the top and bottom legs move in relation to each other.

5. The beam strain gauge of claim 1, further including space on said top leg, bottom leg and side legs for the mounting of electronics.

6. The beam strain gauge of claim 5, wherein said top leg, bottom leg, side legs, beam and loading column are etched from the same material.

7. The beam strain gauge of claim 6, further including at least one etched bonding area on each of said top and bottom legs.

8. A beam strain gauge comprising:
   a top leg;
   a bottom leg below said top leg;
   a rocking beam having a first end and a second end, where said rocking beam is located between and parallel to said top and bottom legs;
   a tension beam having a longitudinal axis and connected to and fixed between said first end of the rocking beam and said top leg;
   a compression beam having a longitudinal axis and connected to and fixed between said second end of the rocking beam and said bottom leg;
   a pivot column interconnecting said rocking beam to said bottom leg;
   at least one resistor mounted on said tension beam; and
   at least one resistor having a primary axis on and mounted on said compression beam.

9. The beam strain gauge of claim 8, further including space on at least one of said top leg and bottom leg for the mounting of electronics.

10. The beam strain gauge of claim 8, wherein said top leg, bottom leg, rocking beam, tension beam, compression beam and pivot column are etched from the same material.

11. The beam strain gauge of claim 8, further including at least one etched bonding area on each of said top and bottom legs.

12. The beam strain gauge of claim 8, wherein said strain gauge is of a semi-conductor material.

13. A beam strain gauge comprising:
   a top leg;
   a bottom leg below said top leg;
   a loading column connected to and extending downward from said top leg;
   a loading column connected to and extending upward from said bottom leg;
   a first rocking beam having a first end and a second end, where said first rocking beam is located below and parallel to said top leg, and said first end of the first rocking beam is attached to said loading column extending from the top leg;
   a second rocking beam having a first end and a second end, where said second rocking beam is located between and parallel to said first rocking beam and said bottom leg, and said first end of the second rocking beam is attached to said loading column extending from the bottom leg;
   a tension beam having a longitudinal axis and connected to and fixed between said first and second rocking beams;
   a compression beam having a longitudinal axis and connected to and fixed between said first and second rocking beam;
   at least one resistor mounted on said tension beam; and
   at least one resistor mounted on said compression beam.

14. The beam strain gauge of claim 13, further including space on at least one of said top leg and bottom leg for the mounting of electronics.

15. The beam strain gauge of claim 13, wherein said top leg, bottom leg, loading columns, rocking beams, tension beam and compression beam are etched from the same material.

16. The beam strain gauge of claim 14, further including at least one etched bonding area on each of said top and bottom legs.

17. The beam strain gauge of claim 15, wherein said strain gauge is of a semi-conductor material.

18. A beam strain gauge comprising:
   a top leg fixed to a surface to be measured;
   a bottom leg below said top leg and fixed to said surface to be measured;
   two side legs connected to and extending from said bottom leg towards said top leg;
   a beam having two ends and a longitudinal axis dividing said beam into a first half and a second half; where said beam is connected to and fixed between said side legs at each of said two ends;
   a loading column interconnecting said beam to said top leg; and
   at least one resistor mounted on said beam.

19. The beam strain gauge of claim 18, further including space on at least one of said top leg, bottom leg and side legs for the mounting of electronics.

20. The beam strain gauge of claim 18, wherein said top leg, bottom leg, side legs, beam and loading column are etched from the same material.

21. The beam strain gauge of claim 18, further including at least one etched bonding area on each of said top and bottom legs.

22. The beam strain gauge of claim 18, wherein said strain gauge is of a semi-conductor material.

* * * * *